Sept. 22, 1925.  R. B. SAALFRANK  1,554,527

FERN PIN

Filed May 9, 1924

INVENTOR.
Royal B. Saalfrank
BY
Cyrus N. Anderson
ATTORNEY.

Patented Sept. 22, 1925.

1,554,527

UNITED STATES PATENT OFFICE.

ROYAL B. SAALFRANK, OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

FERN PIN.

Application filed May 9, 1924. Serial No. 711,969.

*To all whom it may concern:*

Be it known that I, ROYAL B. SAALFRANK, a citizen of the United States, and a resident of Philadelphia, in the county of Philadelphia and State of Pennsylvania, have invented an Improvement in Fern Pins, of which the following is a specification.

Fern pins as heretofore constructed have, as far as I am aware, consisted of short lengths of wire bent to the shape of an ordinary metal wire hair-pin in which the opposite legs or sides are connected by a single bend occupying the plane of the said legs or sides. It has been found that pins of such construction are objectionable for the reason that when employed for fastening leaves in place when the same are employed for decoration purposes or as a part of a floral design the bend connecting the opposite sides of the pins cut or tear through the leaf so that it is apt to fall or be removed from its place in the structure.

The general object of the invention is to provide a fern pin in which the opposite sides are connected by novel means of such character that in use the pins are not apt to cut or tear through the leaf or other similar object through which a pin may be inserted for fastening the same in place.

It is also an object of the invention to provide a pin in which the connecting means between the opposite sides is of such character that the pin when upon a table or other like support does not lie flat upon the same but one portion thereof is held elevated a short distance from the table so that it may be picked up readily and with facility.

Another object of the invention is to provide a fern pin with a novel means for connecting the ends of the opposite sides of such character that it provides means which is adapted to be grasped between a finger and the thumb in order that the pin may be taken in hand readily for the purpose of inserting it through a leaf or other object to be held thereby.

To these and other ends the invention comprehends the construction as hereinafter described in detail, particularly pointed out in the claim and as illustrated in the accompanying drawing forming a part hereof. It will be understood, however, that the invention is susceptible of embodiment in other forms of construction than that shown and that changes in the details and form may be made within the scope of the claim without departing from the principle of the invention.

Figure 1:
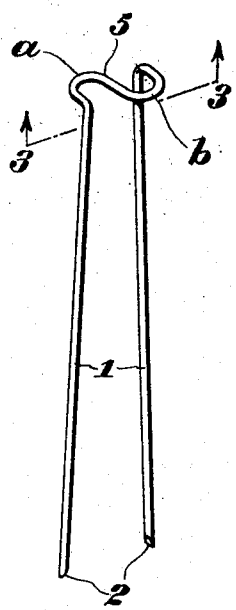
Fig. 1 is a view in perspective of a fern pin embodying the invention.
Figure 2:
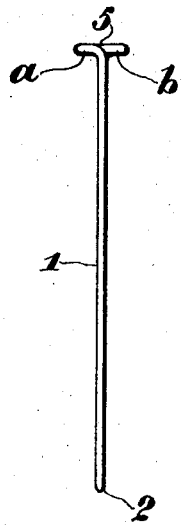
Fig. 2 is a view in edge elevation thereof.
Figure 3:
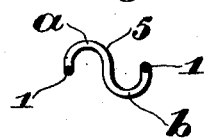
Fig. 3 is a transverse sectional view taken on the line 3—3 of Fig. 1.

Referring to the drawing: 1 designates the opposite sides or legs of a fern pin which are arranged in spaced relation to each other as shown and may be slightly divergent from the base or rear end portion as illustrated in Fig. 1. The outer or forward ends of the said pins are preferably cut upon the bias or at an inclination to the length of the legs, as is indicated at 2, so that the ends of the sides or legs may more readily penetrate or be inserted through a leaf or the like when the same is put into use.

The opposite or rear ends of the sides or legs 1 are connected together by a scroll-shaped or reversely bent portion 5 which bends are arranged in a plane substantially at right angles to the plane occupied by the sides or legs 1 of the pin; that is to say, substantially at right angles to the length of the pin. The scroll or reversely bent connection 5 as illustrated is of S-shape, one loop *a* of which extends in one direction from the plane occupied by the sides or legs 1 while the other loop *b* thereof extends in the opposite direction. This arrangement and relationship is clearly shown in the drawing. It will be apparent that by reason of the fact that the loops *a* and *b* project in opposite directions with respect to the plane in which the legs 1 are located the said legs will not be permitted to lie flat upon a table or other support upon which the pins may be located. If the pins lie upon one side the loop *a* would contact with the table or other support and prevent the legs from lying flat upon the table or other support; whereas if the pin should occupy a position with its other side down the loop *b* would contact with the table or support and prevent the pin from lying flat upon such support. In order to lift the pin from a table or other support one of the legs or sides may be readily grasped between a finger and thumb; also the upwardly extending one of the loops *a* or *b* may be grasped between a finger and thumb for the purpose of lifting the pin from a table or container and thereafter inserting it through a leaf or other object.

It will be seen that the connection between the rear or base ends of the legs or sides 1 of the pin constitutes in effect a flat structure which is adapted to contact with a leaf or other object through which the pin is inserted and engage the same in such manner that it is not likely to cut or tear through the same. It will be noted that the opposite ends of the scroll extend substantially at right angles from the ends of the sides or legs of the pin and in opposite directions with respect to each other. By this arrangement a relatively wide bearing surface is provided which is adapted to contact with a leaf or other object when the pin is inserted therethrough. Hence it will be apparent that by my invention I have provided means whereby the likelihood of the pin's cutting or tearing through a leaf whereby such leaf becomes disconnected from the pin is reduced to a minimum.

It will be seen that by my invention I have provided a fern pin possessed of many advantages and desirable features.

Having thus described my invention, what I claim and desire to secure by Letters Patent is:

A fern pin comprising opposite side portions the rear ends of which are connected by an S-shaped section, the reverse bends of which extend in opposite directions upon opposite sides of the plane in which the sides of the said pin are located.

In testimony that I claim the foregoing as my invention I have hereunto signed my name this sixth day of May, A. D., 1924.

ROYAL B. SAALFRANK